United States Patent [19]
Nozaki

[11] Patent Number: 6,115,969
[45] Date of Patent: Sep. 12, 2000

[54] WEATHER STRIP AND METHOD OF FORMING THE SAME

[75] Inventor: Masahiro Nozaki, Tsushima, Japan

[73] Assignee: Toyoda Gosei Co., Ltd., Aichi-ken, Japan

[21] Appl. No.: 08/985,394

[22] Filed: Dec. 8, 1997

[30] Foreign Application Priority Data

Dec. 9, 1996 [JP] Japan .................................. 8-328604
Jul. 22, 1997 [JP] Japan .................................. 9-195503

[51] Int. Cl.[7] ........................................................ E06B 7/16
[52] U.S. Cl. ............................................. 49/479.1; 49/441
[58] Field of Search ........................ 49/440, 441, 479.1, 49/475.1, 489.1, 495.1

[56] References Cited

U.S. PATENT DOCUMENTS

| | | |
|---|---|---|
| 4,648,207 | 3/1987 | Shibasaki . |
| 4,704,820 | 11/1987 | Kisanuki . |
| 4,894,953 | 1/1990 | Nozaki . |
| 4,910,919 | 3/1990 | Kisanuki et al. . |
| 4,977,706 | 12/1990 | Kisawuki ................ 49/441 X |
| 5,155,938 | 10/1992 | Nozaki ..................... 49/441 |
| 5,195,274 | 3/1993 | Mishima et al. ........... 49/441 |
| 5,447,670 | 9/1995 | Ito et al. . |
| 5,655,333 | 8/1997 | Kamashita ................. 49/441 |

FOREIGN PATENT DOCUMENTS

| | | | |
|---|---|---|---|
| 479430 | 4/1992 | European Pat. Off. | 49/479.1 |
| 5160614 | 12/1980 | Japan | 49/479.1 |
| 8111 | 1/1985 | Japan | 49/472.1 |
| 88609 | 4/1987 | Japan | 49/441 |

*Primary Examiner*—Jerry Redman
*Attorney, Agent, or Firm*—Pillsbury Madison & Sutro LLP

[57] ABSTRACT

A weather strip for attachment to a window frame of a vehicle for sealing the periphery of a window and a method of forming the weather strip. The weather strip supports the window to allow the window to slide upward and downward with respect to the window frame. The weather strip includes an elongated side section for attachment to a generally vertical member of the window frame, an elongated upper section for attachment to a horizontal member of the frame, and a corner section for attachment to a corner of the window frame. The weather strip includes an inner seal lip and an outer seal lip, which resiliently contact the inner and outer surfaces of the window, respectively. The cross sectional shapes of the seal lips vary from the side section to the upper section, yet the inner and outer seal lips are formed of a single continuous extrusion.

8 Claims, 8 Drawing Sheets

Inner Side   Outer Side 14a  14  14b

Inner Side    Outer Side

Inner Side    Outer Side

WEATHER STRIP AND METHOD OF FORMING THE SAME

BACKGROUND OF THE INVENTION

1. Field of the Invention

The present invention relates to weather strips attached to door window frames of vehicles for guiding door windows and methods of forming such weather strips.

2. Description of the Related Art

Weather strips, with which door windows engage, are typically attached to door window frames of vehicles. The weather strip guides the door window and seals between the door window frame and the door window against rainwater or the like. A typical weather strip 109 is shown in FIG. 15. The weather strip 109 includes front and rear side parts 101 shown in FIG. 15(a), an upper part 102 shown in FIG. 15(b), and a connecting part (not shown). The connecting part connects the side parts 101 with the upper part 102. FIGS. 15(a) and 15(b) are cross-sectional views showing the side part 101 and the upper part 102, respectively. The side part 101 includes an inner seal lip 104 and an outer seal lip 105. The inner seal lip 104 resiliently contacts an inner surface 103a of the door window 103 at a front or rear edge. The outer seal lip 105 resiliently contacts an outer surface 103b of the door window 103 at a front or rear edge.

An auxiliary lip 106 extends from the proximal portion of the outer lip 105. The auxiliary lip 106 reduces whistling of wind passing through a clearance 110, which is defined between the door window 103 and the outer seal lip 105. Furthermore, the auxiliary lip 106 improves the rigidity of the outer seal lip 105 and prevents the outer seal lip 105 from deforming toward the exterior of the vehicle when the window 103 moves. The side part 101 is extruded to have a uniform cross section.

The structure of the upper part 102 is almost the same as that of the side part 101 except for the auxiliary lip 106. The upper part 102 includes an inner seal lip 107 and an outer seal lip 108. The inner seal lip 107 resiliently contacts the inner surface 103a of the door window 103 at an upper edge, while the outer seal lip 108 resiliently contacts the outer surface 103b of the door window 103 at the upper edge.

No auxiliary lip 106 extends from the outer seal lip 108. This prevents the window 103 from catching the auxiliary lip 106 while moving upward between the inner seal lip 107 and the outer seal lip 108. The inner seal lip 107 of the upper part 102 is larger than the inner seal lip 104 of the side part 101. This improves the rigidity of the inner seal lip 107. The inner seal lip 107 is also resilient to guide the window 103, which moves upward between the inner seal lip 107 and the outer seal lip 108, to a predetermined position indicated by the double dotted chain line in FIG. 15(b). The upper part 102 is also extruded to have a uniform cross section.

The connecting part corresponds to a corner of the window 103 and connects the side part 101 with the upper part 102. The connecting part 101 is formed through injection molding or the like.

The weather strip 109 includes at least three members, that is, the front and rear side parts 101, the upper part 102, and the connecting part. Manufacture of these members requires independent molds, such as an extruder and an injection molding for separately forming the side parts 101, the upper part 102, and the connecting part. Furthermore, to form the weather strip 109, the front and rear side parts 101, and the upper part 102, each of which has been extruded independently, must be connected to one another by the connecting part (at the front upper corner and the rear upper corner). Therefore, at least four types of molds (two types of extrusion molding dies and two types of injection molds) are necessary to manufacture the conventional weather strip 109. This complicates the manufacturing equipment. Furthermore, since four or more parts must be formed separately, the number of manufacturing steps is increased.

SUMMARY OF THE INVENTION

Accordingly, it is an object of the present invention to provide a one-piece extruded weather strip having a variable cross sectional shape. A further object is to simplify the equipment and method for manufacturing the weather strip.

To achieve the above objects, a weather strip for attachment to a window frame of a vehicle is provided in a first aspect of the present invention. The weather strip contacts a surface of the window for sealing a periphery of the window. The weather strip guides the window while allowing the window to slide upward and downward with respect to the window frame. The weather strip includes an elongated side section for attachment to a generally vertical member of the window frame, an elongated upper section for attachment to a generally horizontal member of the window frame, and a corner section for attachment to a corner of the window frame. All sections are formed integrally and continuously. A continuous seal lip extrusion resiliently contacts a surface of the window. The seal lip forms part of and is coextensive with the side section, the corner section, and the upper section. The cross sectional shape of the seal lip extrusion varies from a first shape along the side section to a second shape along the upper section such that the seal has different sealing characteristics along the side section as compared to the sealing characteristics of the upper section. A transition shape between the first shape and the second shape is formed in the corner section.

In a second aspect of the present invention, a weather strip for attachment to a window frame of a vehicle is provided. The weather strip contacts both an inner surface and an outer surface of the window. The weather strip supports the window while allowing the window to slide upward and downward with respect to the window frame. The weather strip includes an elongated side section for attachment to a generally vertical member of the window frame, an elongated upper section for attachment to a generally horizontal member of the window frame, and a corner section for attachment to a corner of the window frame. All sections are formed integrally and continuously. A continuous inner seal lip extrusion resiliently contacts the inner surface of the window. The inner seal lip forms part of and is coextensive with the side section, the corner section, and the upper section. The cross sectional shape of the inner seal lip varies from the upper section to the side section. A continuous outer seal lip extrusion resiliently contacts the outer surface of the window. The outer seal lip forms part of and is coextensive with the side section, the corner section, and the upper section. The cross sectional shape of the outer seal lip varies from the upper section to the side section. The outer lip seal is parallel to the inner lip seal.

In a third aspect of the present invention, a method of extruding a weather strip for a vehicle window frame is provided. The method includes the step of extruding a single weather strip by an extruder, the cross sectional shape of which varies longitudinally. The weather strip includes a side section for attachment to a generally vertical member of the window frame, a corner section for attachment to a corner of the frame, and an upper section for attachment to a generally horizontal member of the frame. The corner section lies between and is integral with the upper section and the side section. The extruding step it includes extruding the inner and the outer seal lips to be coextensive with the side section, the corner section, and the upper section. The inner seal lip is initially extruded with a first cross sectional shape. The extruding step also includes changing the cross sectional area of the inner seal lip to form a second cross sectional shape by changing the size of a molding die opening of the extruder after a predetermined time such that the seal lip extending along the upper section has different sealing characteristics than that extending along the side section, and forming a transition between the first cross sectional shape and the second cross sectional shape on the corner section by performing the step of changing the size of the molding die opening while extruding the corner section.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First embodiment

A one-piece weather strip according to a first embodiment of the present invention will now be described with reference to FIGS. 1 to 6.

Figure 2:
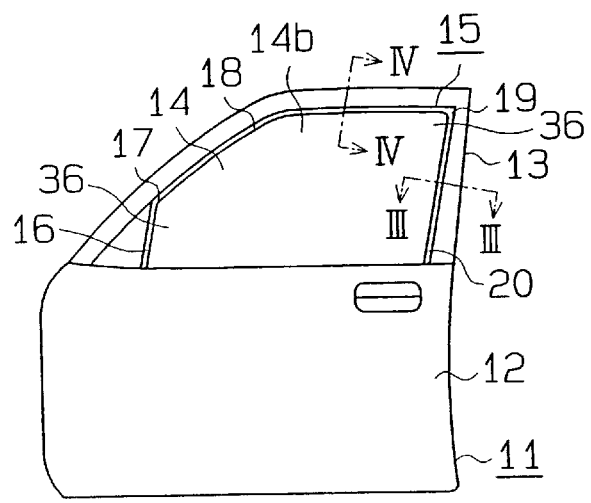
FIG. 2 is a side view showing a vehicle door including the weather strip attached to a door window frame.

As shown in FIG. 2, a door 11 of a vehicle includes a door body 12, a door window frame 13 arranged above the body 12, and a door window 14, which moves upward and downward. The frame 13 is slightly inclined with respect to the plane of the sheet of FIG. 2. The window 14 moves upward and downward along the frame 13.

An integral weather strip 15, which is formed of ethylene propylene diene copolymer (EPDM), is attached to the inner edge of the door window frame 13. The weather strip 15 is substantially linear before being attached to the frame 13. However, when attached to the frame 13, the weather strip 15 is shaped in correspondence with the shape of the frame 13. Specifically, the one piece weather strip 15 includes a front side section 16, a rear side section 20, an upper section 18, a front corner section 17, and a rear corner section 19. The side sections 16, 20 extends along the front and rear edges of the window 14 and along the direction of movement of the window 14 (in a substantially vertical direction as viewed in FIG. 2). The upper section 18 extends horizontally along the top edge of the window 14. The front corner section 17 is integral with the front side section 16 and the front end of the upper section 18, while the rear corner section 19 is integral with the rear side section 20 and the rear end of the upper section 18.

Figure 3:
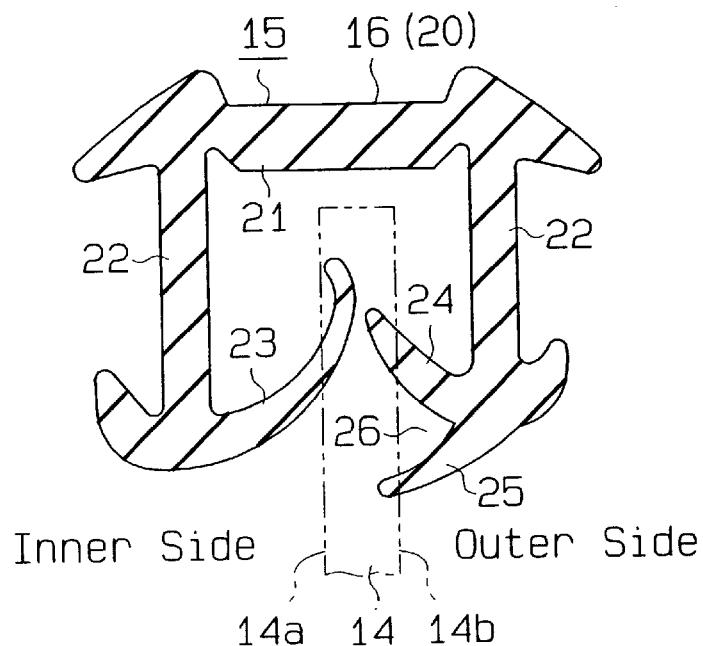
FIG. 3 is an enlarged cross-sectional view of a side section of the weather strip taken along the line III—III of FIG. 2.

As shown in FIG. 3, each side section 16, 20 includes a base 21, a pair of side walls 22, an inner seal lip 23, and an outer seal lip 24. The side walls 22 extend parallel to each other and project from opposite ends of the base 21. The seal lips 23, 24 project from the distal ends of the associated side walls 22. Each lip 23, 24 is curved inwardly to extend toward the base 21. The inner seal lip 23 resiliently contacts an inner side surface of the window 14 (hereafter referred to as an inner surface 14a). The outer lip 24 resiliently contacts an outer side surface of the window 14 (hereafter referred to as an outer surface 14b). Each lip 23, 24 is tapered to narrow toward its edge. Furthermore, an auxiliary lip 25 projects from the proximal portion (the portion connected with the associated outer side wall 22) of the outer seal lip 24 (projecting downwardly to the left as viewed in FIG. 3). The auxiliary lip 25 increases the rigidity of the proximal portion of the outer seal lip 24 to increase the pressing force applied by the outer seal lip 24 to the window 14. Furthermore, the auxiliary lip 25 prevents wind stream from passing through a clearance 26, which is defined between the outer seal lip 24 and the window 14.

Figure 4:
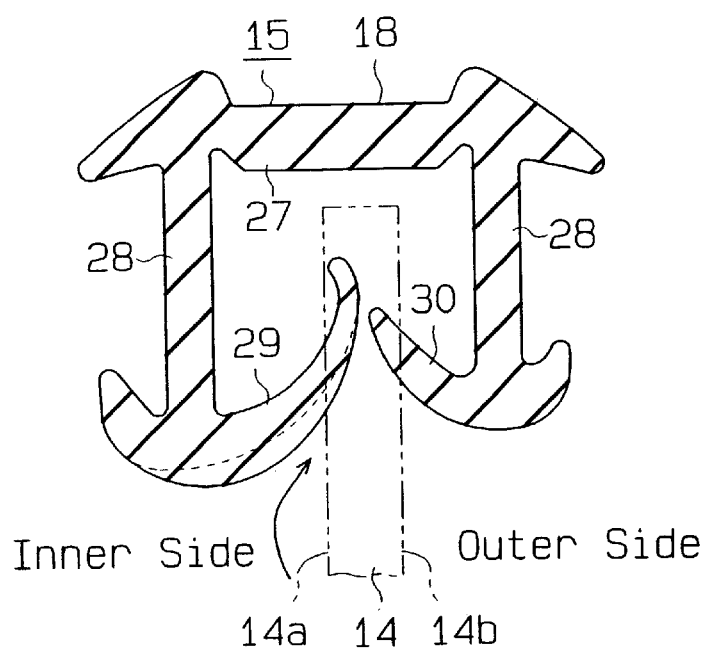
FIG. 4 is an enlarged cross-sectional view of an upper section of the weather strip taken along the line IV—IV of FIG. 2.

As shown in FIG. 4, the upper section 18 includes a base 27, a pair of side walls 28, an inner seal lip 29, and an outer lip 30. The side walls 28 are parallel to each other, each projecting from one end of the base 27. The seal lips 29, 30 project from the distal ends of the associated side walls 28 and are curved inwardly to extend toward the base 27. The inner seal lip 29 resiliently contacts an upper part of the inner surface 14a of the window 14. The outer seal lip 30 resiliently contacts an upper part of the outer surface 14b of the window 14. Each lip 29, 30 is tapered to narrow toward its distal edge. There is no auxiliary lip 25 on the proximal portion of the outer seal lip 30. The inner seal lip 29 is larger than the corresponding inner seal lip 23 of the side sections 16, 20. Specifically, the inner seal lip 29 has additional material on its lower edge, as indicated by the chain line in FIG. 4 (which delineates the shape of the corresponding inner seal lip 23 of the side sections 16, 20 for comparison).

Figure 1:
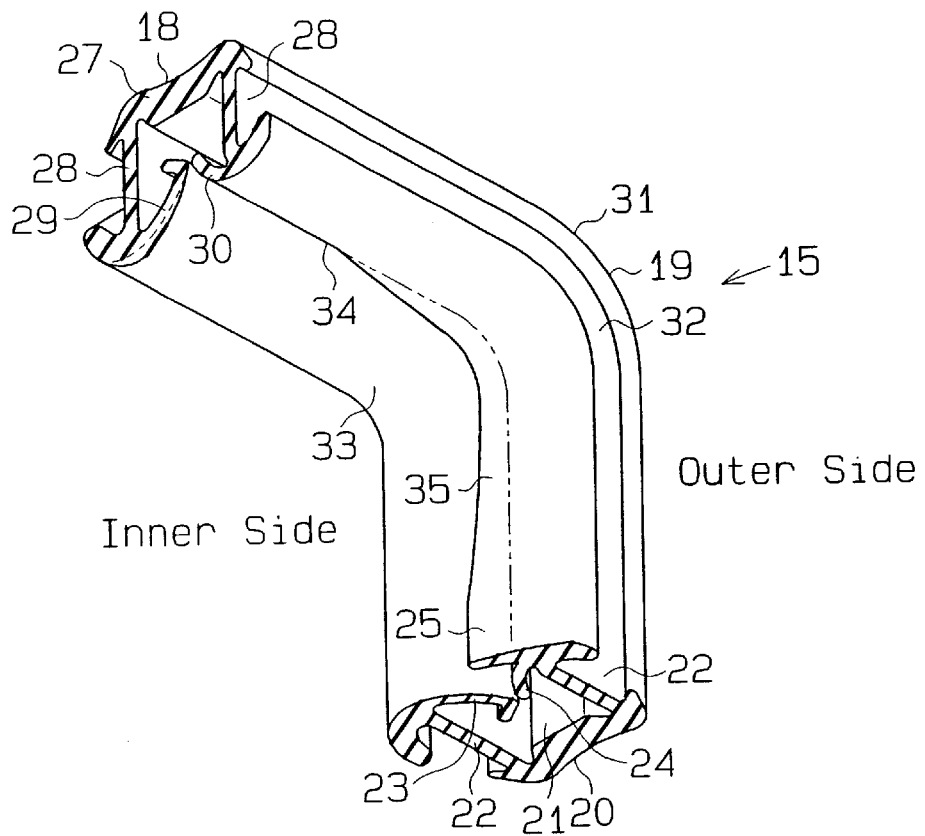
FIG. 1 is a perspective view showing a rear corner of a first embodiment of a weather strip according to the present invention.

As shown in FIG. 1, the rear corner section 19 includes a base 31, a pair of side walls 32, an inner seal lip 33, and an outer seal lip 34. The side walls 32 extend parallel to each other, each projecting from one end of the base 31. Each seal lip 33, 34 projects inwardly from the distal end of the associated side wall 32 to extend toward the base 31. The inner seal lip 33 resiliently contacts the inner surface 14a along a corner 36 (see FIG. 2) of the window 14, while the outer seal lip 34 resiliently contacts the outer surface 14b along the corner 36 of the window 14.

An auxiliary lip 35 projects from the proximal portion of the outer seal lip 34 in the same manner as the auxiliary lip 25 of each side section 16, 20. However, the projecting distance of the auxiliary lip 35 varies along the outer seal lip 34. Specifically, such distance is maximum (equal to that of the auxiliary lip 25 of the side sections 16, 20) at an end of the rear corner section 19 adjacent to rear the side section 20. The projecting distance decreases toward the upper section 18 and becomes minimum (zero) at the end of the rear corner section 19 that is adjacent to the upper section 18.

Furthermore, the inner seal lip 33 becomes larger at locations nearer to the end adjacent to the upper section 18. Specifically, the inner seal lip 33 is the largest (equal to that of the inner seal lip 29 of the upper section 18) at an end of the rear corner section 19 adjacent to the upper section 18. The inner seal lip 33 becomes smaller toward the rear side section 20 and becomes the smallest (equal to that of the inner seal lip 23) at the end of the rear corner section 19 adjacent to the rear side section 20.

The front corner section 17 has the same structure as the illustrated rear corner section 19. Thus, to avoid redundancy, the front corner section 17 will not be described. Furthermore, to decrease resistance to the sliding of the window 14, lubricating agents such as urethane and silicone are applied to the surfaces of the lips 23, 24, 29, 30, 33, 34. Alternatively, a lubricating layer formed of polyethylene resin or a brush may be employed instead of the lubricating agent.

Figure 5:
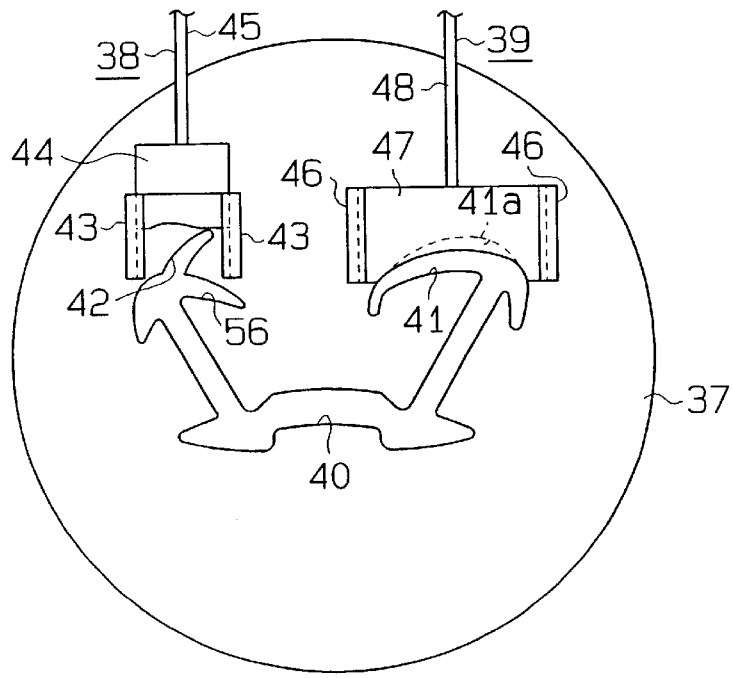
FIG. 5 is a front view showing the relationship between a fixed molding die and two movable dies when extruding the side section of the weather strip of FIG. 3.
Figure 6:
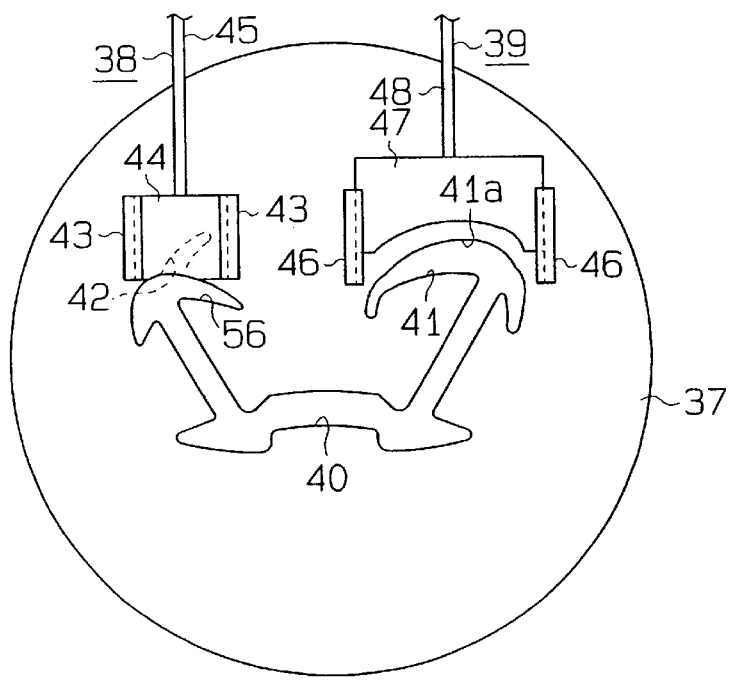
FIG. 6 is a front view showing the relationship between the fixed molding die and the movable dies when extruding the upper section of the weather strip of FIG. 4.

The integral weather strip 15 described above is formed by means of extrusion molding. The method for extrusion molding the weather strip 15 is disclosed in U.S. patent application Ser. No. 08/885,195 (filed by the co-assignee of the present application) and is incorporated herein by reference. This method employs, as shown in FIGS. 5 and 6, a fixed molding die 37, a first movable die 38, a second movable die 39, and a driving gear (not shown) that vertically reciprocates the movable dies 38, 39. The first movable die 38 and the second movable die 39 are arranged at one side of the fixed molding die 37. An opening 40 is defined in the fixed molding die 37 in correspondence with the shape of the weather strip 15. The opening 40 includes sub-openings for the bases 21, 27, 31, the side walls 22, 28, 32, the seal lips 23, 24, 29, 30, 33, 34 and the auxiliary lips 25, 35. A sub-opening 41 is defined in the opening 40 for forming the inner lips 23, 29, 33. The sub-opening 41 corresponds to the shape of the inner seal lip 29 of the upper section 18, which has the largest cross sectional area among the seal lips 23, 29, 33.

Furthermore, a sub-opening 56 is defined in the opening 40 for forming the outer seal lips 24, 30, 34. The distance between the sub-opening 41 and the sub-opening 56 is greater than the distance between the inner seal lip 23, 29, 33 and the associated outer seal lip 24, 30, 34 of the finished weather strip 15. This prevents the inner seal lip 23, 29, 33 and the associated outer seal lip 24, 30, 34 from being close to each other immediately after being extruded.

The first movable die 38 includes a pair of fixed guide members 43, a shutter 44 arranged between the guide members 43, and a shaft 45 connecting the shutter 44 with the driving gear. Each guide member 43 extends vertically in the vicinity of a variable sub-opening 42, which forms the auxiliary lips 25, 35. The shutter 44 reciprocates between an open position (see FIG. 5) and a closed position (see FIG. 6) while contacting the face of the fixed molding die 37. The shutter 44 opens the sub-opening 42 when held in the open position and closes the sub-opening 42 when held in the closed position.

The second movable die 39 includes a pair of fixed guide members 46, a shutter 47 arranged between the guide members 46, and a shaft 48 connecting the shutter 47 with the driving gear. Each guide member 46 extends vertically in the vicinity of an enlarged sub-opening 41 including a variable sub-opening 41a. The shutter 47 reciprocates between an open position (see FIG. 6) and a closed position (see FIG. 5) while contacting the face of the fixed molding die 37. The shutter 47 opens the variable sub-opening 41a when held in the open position and closes the variable sub-opening 41a when held in the closed position.

The one piece weather strip 15 is formed by extruding rubber material, which is supplied by an extruder (not shown), continuously through the opening 40 of the fixed molding die 37. Furthermore, each movable die 38, 39 reciprocates between its open position and its closed position to vary the shape of the opening 40. In this manner, the material is extruded through the opening 40 so that the cross sectional areas of the side section 16, 20, the upper section 18, and the corner sections 17, 19 each have shapes that are different from one another.

If the material is extruded in the order of 1) the rear side section 20, 2) the rear corner section 19, 3) the upper section 18, 4) the front corner section 17, and 5) the front side section 16, the weather strip 15 is manufactured specifically in the following manner.

To form the rear side section 20, as shown in FIG. 5, the shutter 44 of the first movable die 38 is held in the open position, while the shutter 47 of the second movable die 39 is held in the closed position. The sub-opening 42 is then open to extrude material through the sub-opening 42, while the variable sub-opening 41a is closed to prevent the material from being extruded through the sub-opening 41a. Thus, the material is extruded through the opening 40 to form the rear side section 20, which includes the outer seal lip 24, the auxiliary lip 25 projecting from the proximal portion of the outer seal lip 24, and the inner seal lip 23, which is not enlarged, as shown in FIG. 3.

The same extrusion is continued to form the rear corner section 19. However, the shutter 44 of the first movable die 38 gradually moves from the open position to the closed position. Synchronously with the shutter 44, the shutter 47 of the second movable die 39 moves gradually from the closed position to the open position. In this manner, the sub-opening 42 is gradually closed off. The shutter 44 thus restricts extrusion of the rubber material. This gradually reduces the amount of the rubber material passing through the sub-opening 42. Furthermore, the sub-opening 41a is gradually opened, as the shutter 47 gradually retreats from the sub-opening 41a. This gradually increases the amount of rubber material passing through the sub-opening 41a. Therefore, the projecting distance of the auxiliary lip 35 decreases as the extrusion progresses, while the inner seal lip 33 becomes larger as the extrusion progresses. The rear corner section 19 is thus integrally extruded with the rear side section 20.

The same extrusion is continued to integrally form the upper section 18. To form the upper section 18, the movement of the first movable die 38 and the second movable die 39 in forming the corner section 19 is completed. The shutter 44 of the first movable die 38 is then held in the closed position, while the shutter 47 of the second movable die 39 is held in the open position, as shown in FIG. 6. In this manner, the sub-opening 42 is closed to restrict flow of the rubber material. Furthermore, the sub-opening 41a is open to allow material to pass through the sub-opening 41a. The rubber material is thus extruded through the opening 40 to form the upper section 18. The upper section 18 includes the outer seal lip 30, which does not have the auxiliary lips 25, 35, and it has the enlarged inner seal lip 29, as shown in FIG. 4.

The same extrusion continues to form the front corner section 17. To form the front corner section 17, the shutter 44 of the first movable die 38 moves gradually from the closed position to the open position. Synchronously with the shutter 44, the shutter 47 of the second die 39 moves gradually from the open position to the closed position. In this manner, the sub-opening 42 gradually opens, and the shutter 44 retreats from the sub-opening 42. This gradually increases the amount of the rubber material passing through the sub-opening 42. Furthermore, the sub-opening 41a is gradually closed off, and the shutter 47 thus restricts extrusion of material. This gradually reduces the amount of material passing through the sub-opening 41a. Therefore, the projecting distance of the auxiliary lip 35 increases longitudinally, while the inner seal lip 33 becomes smaller. The front corner section 17 is thus extruded integrally with the upper section 18.

The extrusion continues to form the front side section 16. Furthermore, the front side section 16 is extruded in the same manner as the previously described rear side section 20. To form the side section 16, the movement of the first movable die 38 and the second movable die 39 is completed. The initial position of the movable dies 38, 39 are thus restored to the position of FIG. 5.

As described, the first embodiment of the weather strip 15 is a single member, although the cross sectional shapes of the side section 16, 20, the upper section 18, and the corner sections 17, 19 are different from one another. Furthermore, the side sections 16, 20, the upper section 18, and the corner sections 17, 19 are formed integrally in a single extrusion. Therefore, the side sections 16, 20, the upper section 18, and the corner sections 17, 19 need not be formed independently and connected to one another afterward. This simplifies the process and the equipment for manufacturing the weather strip 15.

The functions of the weather strip 15, when attached to the window frame 13 of the vehicle, will hereafter be described.

The auxiliary lip 25 of each side section 16, 20 increases the pressing force applied by the outer seal lip 24 against the window 14. This reduces outward deformation of the outer seal lip 24 even though the window 14 moves against the outer seal lip 24 while the outer seal lip 24 is contacting the window 14. Furthermore, when the window 14 moves to the uppermost position and is completely closed, the clearance 26 has the form of a V-shaped groove between the outer seal lip 24 and the window 14. Thus, wind may pass through the clearance 26 to cause whistling during traveling of the vehicle. However, the auxiliary lip 25, which projects from the proximal portion of the outer seal lip 24, closes the clearance 26 to prevent wind stream from passing through the clearance 26. This prevents the wind from producing a whistling noise.

The inner seal lip 29 of the upper section 18 is larger than the inner seal lip 23 of each side section 16, 20. This increases the rigidity of the inner seal lip 29. Thus, the distal portion of the inner seal lip 29 is harder to bend. Furthermore, the window 14 moves upward while contacting the inner seal lip 29, which is enlarged. This positively guides the window 14 to a predetermined position with respect to the upper section 18. In addition, the auxiliary lips 25, 35 are not provided on the outer seal lip 30. This prevents the window 14 from catching the auxiliary lips 25, 35, when the upper edge of the window 14 enters between the seal lips 29, 30 of the upper section 18.

Therefore, the weather strip 15, which has the same function as that of the conventional weather strip, is extruded by one extruder in a single extrusion.

The first embodiment has the following characteristics other than those described above.

(a) The conventional weather strip 109 is constructed by at least three independent parts. This may cause a step or a slight gap to be defined between the corner part and the side part 101 or the corner part and the upper part 102. This makes the appearance of the weather strip 109 less pleasing. Also, the step defined between the seal lips varies the pressing force applied by the seal lips to the window 103, which varies the sealing performance of the seal lips. To solve these problems, the seal lips need be machined afterward. However, the weather strip 15 according to the present invention is formed as a single member through extrusion molding. The weather strip 15 thus has no step or gap. This improves the appearance of the weather strip 15 and enables uniform sealing performance of the weather strip 15. This also eliminates the need for the machining and facilitates the manufacturing process.

(b) In the conventional weather strip, the side part 101, and the upper part 102 are extruded separately by extrusion molding. Furthermore, the corner part is molded independently by injection molding. Thus, a lubricating agent such as polyurethane is applied independently to the side part 101, the upper part 102, and the corner part. However, in the first embodiment of FIGS. 1 to 6, the side sections 16, 20, the upper section 18, and the corner sections 17, 19 are extruded in one extrusion by a single extruder. Therefore, the lubricating agent can be applied to the seal lips 23, 24, 29, 30, 33, 34 during the extrusion molding of the weather strip 15. This further reduces the number of steps for manufacturing the weather strip 15.

Second embodiment

The second embodiment according to the present invention will now be described with reference to FIGS. 7 to 9.

Figure 7:
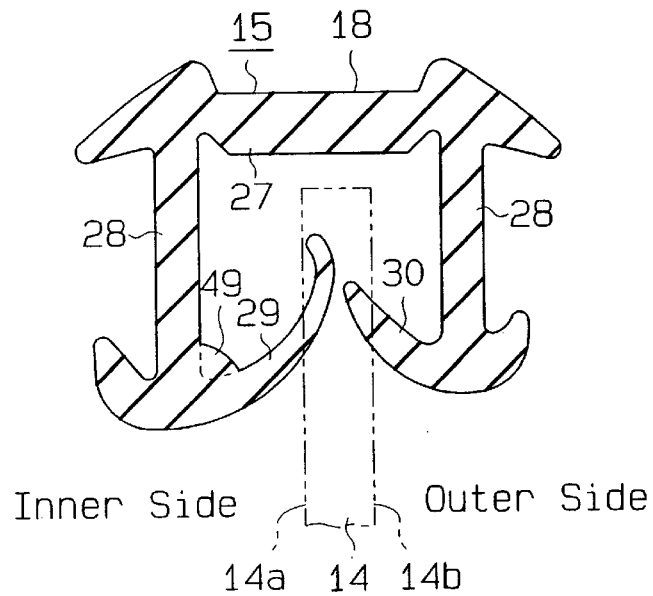
FIG. 7 is an enlarged cross-sectional view showing an upper section of a weather strip according to a second embodiment.

As shown in FIG. 7, the second embodiment of the weather strip 15 includes an expanded portion 49. The expanded portion 49 is located on the inner side of the proximal portion of the inner seal lip 29 of the upper section 18 to increase the rigidity of the inner seal lip 29.

Figure 8:
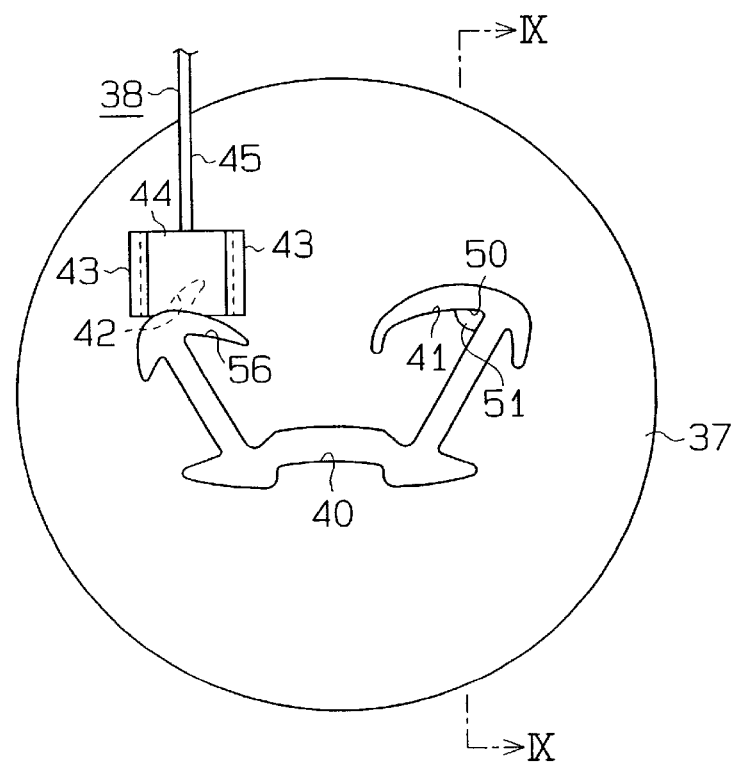
FIG. 8 is a front view showing the relationship between the position of an opening and the position of movable dies for extruding the upper section of the weather strip of FIG. 7.
Figure 9:
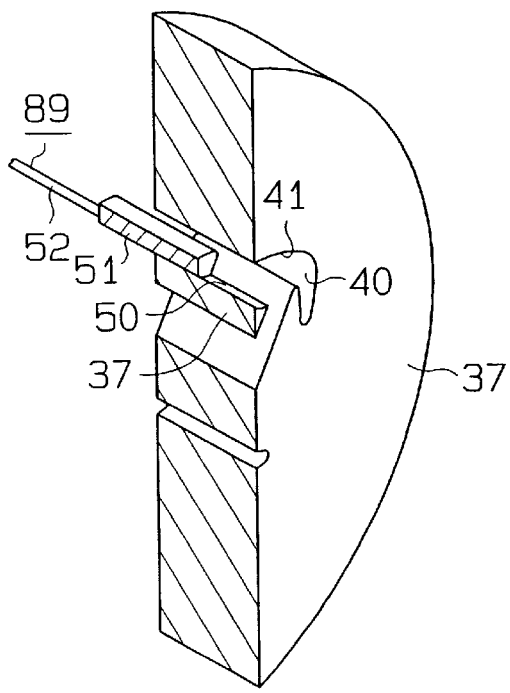
FIG. 9 is a perspective cross-sectional view taken along the line IX—IX in FIG. 8.

As shown in FIGS. 8 and 9, to form the weather strip 15 including the expanded portion 49, the opening 40 of the fixed molding die 37 is shaped in a different manner from that of the first embodiment. Furthermore, the structure of a second movable die 89 differs from that of the second movable die 39 of the first embodiment. Specifically, the variable sub-opening 41a is not defined in the opening 40. However, a variable sub-opening 50 is defined to form the expanded portion 49. The second movable die 89 includes a shutter 51 and a shaft 52, which connects the shutter 51 with the driving gear. The shutter 51 moves longitudinally to project into the sub-opening 50 and backward to retreat from the sub-opening 50. When the driving gear is actuated, the shutter 51 reciprocates between an open position (see FIG. 9) and a closed position. The shutter 51 opens the sub-opening 50 when held in the open position and closes the sub-opening 50 when held in the closed position. When the shutter 51 is held in the closed position, the distal end of the shutter 51 is flush with the exit side of the fixed molding die 37.

Formation of the expanded portion 49 depends on the position of the shutter 51, which reciprocates between the open position and the closed position. Specifically, to form each side section 16, 20, the shutter 51 is held in the closed position to close the sub-opening 50. This forms the side section 16, 20 having the cross sectional shapes shown in FIG. 3, which does not include the expanded portion 49.

To form the rear corner section 19, the shutter 51 gradually moves (retreats) from the closed position toward the open position. The shutter 51 then retreats from the sub-opening 50. This gradually increases the amount of material passing through the sub-opening 50 as the extrusion progresses. The expanded portion 49, which becomes gradually larger along the inner seal lip 33 as the extrusion progresses, is thus formed to form the rear corner section 19. Furthermore, to form the front corner section 17, the shutter 51 moves from the open position toward the closed position. The expanded portion 49 then becomes gradually smaller along the inner seal lip 33 as the extrusion progresses. The front corner section 17 is thus formed.

To form the upper section 18, the shutter 51 is held in the open position to form the expanded portion 49. Specifically, when the rubber material passes through the opening 40, some of the rubber material passes through the sub-opening 50. The material is therefore shaped as the expanded portion 49, which is arranged on the inner seal lip 29. The upper section 18 is thus formed.

As described above, although the cross sectional shapes of the side sections 16, 20 are different from that of the upper section 18, the side sections 16, 20, the upper section 18, and the corner sections 17, 19 are integrally formed in a single extrusion. The weather strip 15 of the second embodiment is thus constructed by a single piece of material. This facilitates the process and the equipment for manufacturing the weather strip 15 in the same manner as the first embodiment.

The functions of the weather strip 15 of the second embodiment, when attached to the door window frame 13 of the vehicle, are the same as that of the first embodiment. In other words, the auxiliary lip 25 of each side section 16, 20 reduces outward deformation of the outer seal lip 24 when the window 14 moves upward and downward. The auxiliary lip 25 also suppresses the whistling noise of the wind. Furthermore, the expanded portion 49, which is arranged on the inner seal lip 29 of the upper section 18, increases the rigidity of the inner seal lip 29 in comparison with the inner seal lip 23 of the side section 16, 20. The inner seal lip 29 is thus hard to bend. This enables the window 14 to move upward while contacting the inner seal lip 29, which guides the window 14 to a predetermined position.

Therefore, the weather strip 15 of the second embodiment of FIGS. 7 to 9 has a varied cross sectional shape and is formed as a single member by a single extruder. Furthermore, the weather strip 15 of the second embodiment has the same function as that of the conventional weather strip.

Third embodiment

Figure 10:
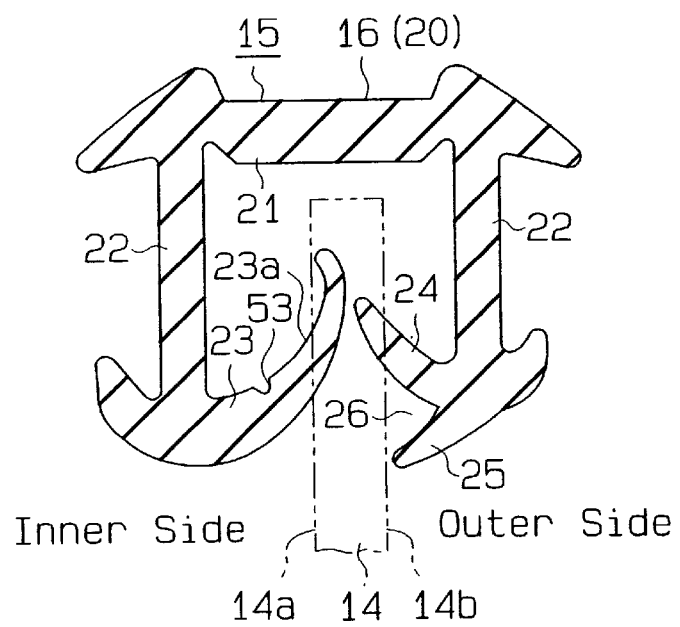
FIG. 10 is an enlarged cross-sectional view showing a side section of a weather strip according to a third embodiment.

The third embodiment according to the present invention will hereafter be described with reference to FIGS. 10 and 11.

In the third embodiment, the inner seal lip 23 of each side section 16, 20 and the inner seal lip 29 of the upper section 18 are both enlarged like the inner seal lip 29 of the first embodiment, as indicated by the chain line in FIG. 4. This enlarges a large portion of each inner seal lip 23, 29 extending from the proximal portion of the inner seal lip 23, 29 toward the edge of the inner seal lip 23, 29. The inner seal lip 29 of the upper section 18 thus has a high rigidity. Furthermore, as shown in FIG. 10, a notch 53 is defined in a side 23a of the inner seal lip 23 that does not contact the window 14. This improves the flexibility of the distal portion of the inner seal lip 23 of each side section 16, 20.

Figure 11:
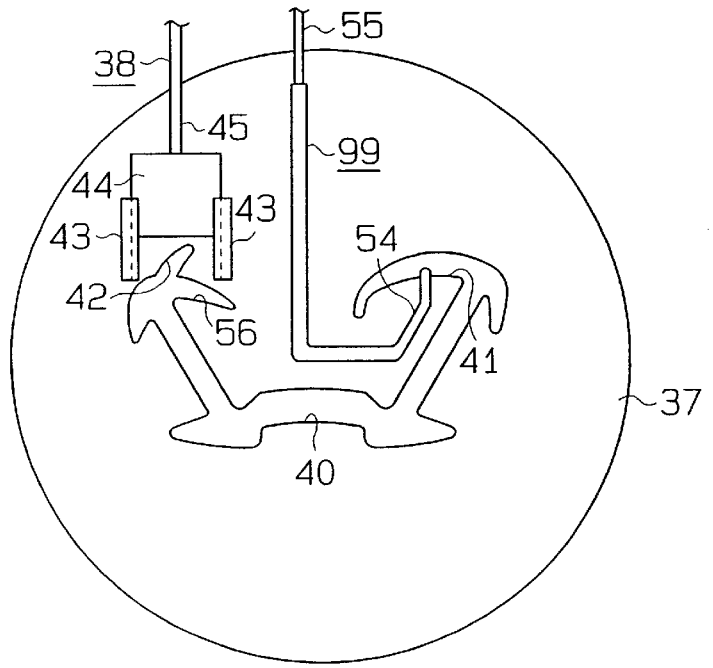
FIG. 11 is a front view showing the relationship between a fixed molding die and movable dies for extruding the side section of the weather strip of FIG. 10.

The weather strip 15 having the notched inner seal lip 23 is formed by the movable die shown in FIG. 11. This die includes a second movable die 99, the structure of which differs from that of the second movable die 39 of the first embodiment. The second movable die 99 includes a curved shutter 54 and a shaft 55 connecting the shutter 54 with the driving gear (not shown). When the driving gear is actuated, the shutter 54 reciprocates vertically between a projected position (see FIG. 11) and a retreated position while contacting the side of the fixed molding die 37. The shutter 54 projects into a sub-opening 41 of the opening 40 when held in the projected position, while the shutter 54 retreats from the sub-opening 41 when held in the retreated position.

Defining of the notch 53 depends on the position of the shutter 54, which reciprocates between the projected position and the retreated position. Specifically, to form the front and the rear side sections 16, 20, the shutter 54 is maintained in the projected position. In this state, a portion of the shutter 54 projects into the opening 40. This restricts flow of the rubber material passing through the opening 40. The side sections 16, 20 having the notch 53 defined in the inner seal lip 23, as shown in FIG. 10, are thus formed.

To form the rear corner section 19, the shutter 54 moves (downward) gradually from the projected position to the retreated position. The shutter 54 then retreats from the sub-opening 41. This gradually increases the amount of the rubber material passing through the sub-opening 41. Therefore, the depth of the notch 53 decreases along the inner seal lip 33 as the extrusion progresses. The corner section 19 is thus formed with a cross sectional shape that varies with time. Furthermore, to form the front corner section 17, the shutter 54 moves gradually from the retreated position to the projected position.

To form the upper section 18, the shutter 54 is maintained in the retreated position. The rubber material then flows through the entire opening 40. Thus, the rubber material is extruded through the opening 40 to form the upper section 18, which does not include the notch 53 on the inner seal lip 29.

As described above, although the cross sections of each side section 16, 20 and the upper section 18 have shapes different from each another, the side sections 16, 20, the upper section 18, and the corner sections 17, 19 are formed integrally by means of extrusion molding. The weather strip 15 of the third embodiment is thus formed as a single extruded piece. This facilitates the process and the equipment for manufacturing the weather strip 15 in the same manner as the first embodiment.

Functions of the weather strip 15 of the third embodiment when attached to the door window frame 13 of the vehicle are the same as those of the first embodiment. Specifically, although the entire inner seal lip 23 of each side section 16, 20 is enlarged, the notch 53 is defined in the inner seal lip 23. This increases the flexibility of the distal portion of the inner seal lip 23 in comparison with the inner seal lip 29 of the upper section 18. The pressing force applied by the inner seal lip 23 on the window 14 is thus decreased. This reduces the resistance of the inner seal lip 23 to the sliding of the window 14. However, the notch 53 is not defined in the inner seal lip 29 of the upper section 18. This increases the rigidity of the inner seal lip 29 in comparison with the inner seal lip 23 of the side sections 16, 20. The inner seal lip 29 is thus hard to bend. This enables the window 14 to move upward while contacting the inner seal lip 29, which guides the window 14 to a predetermined position of the upper section 18.

Fourth embodiment

A fourth embodiment according to the present invention will now be described with reference to FIGS. 12 and 13.

Unlike the first to third embodiments, a weather strip 61 of the fourth embodiment is formed partially by means of injection molding.

Figure 12:
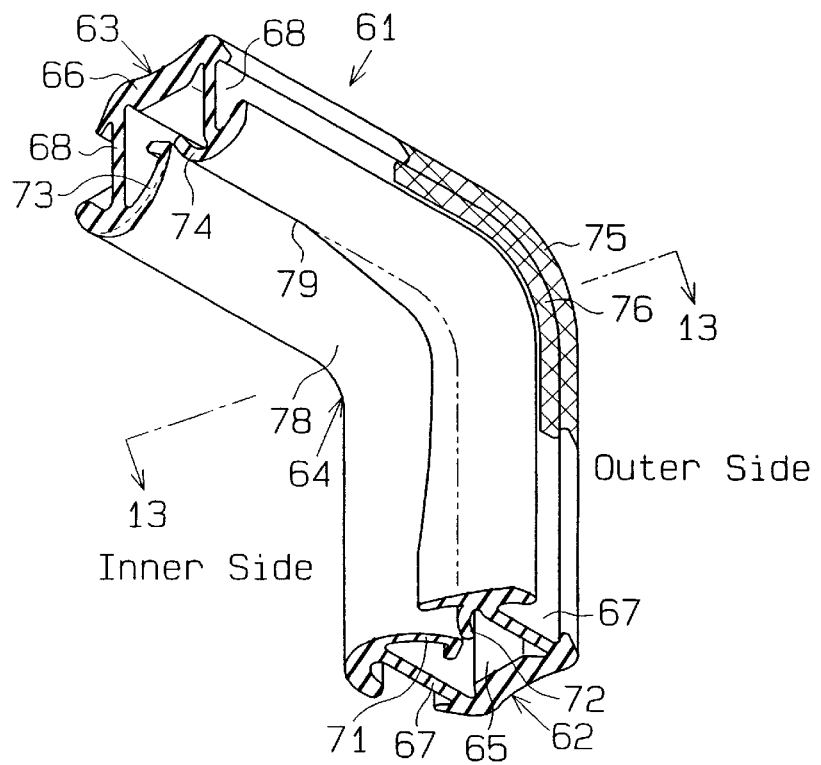
FIG. 12 is a perspective view showing a corner section of a weather strip according to a fourth embodiment.
Figure 13:
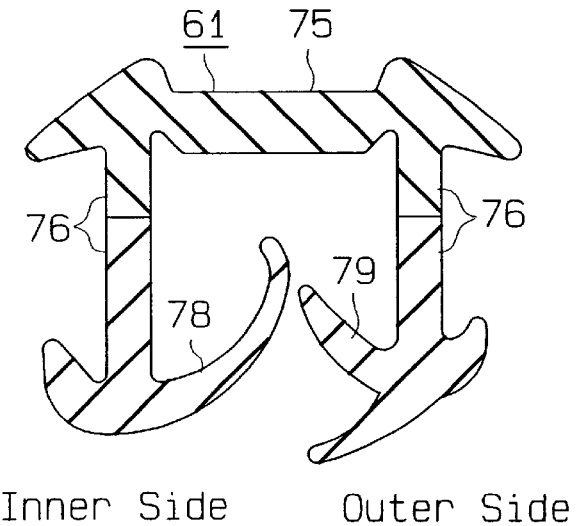
FIG. 13 is an enlarged cross-sectional view taken along the line XIII—XIII in FIG. 12.

As shown in FIGS. 12 and 13, the weather strip 61 includes, for example, a side section 62, an upper section 63, and a corner section 64, which connects the side section 62 with the upper section 63. In the same manner as the first embodiment, the side section 62 includes a base 65, a pair of side walls 67, an inner seal lip 71, and an outer seal lip 72. Furthermore, the upper section 63 includes a base 66, a pair of side walls 68, an inner seal lip 73, and an outer seal lip 74. In addition, the corner section 64 includes a base 75, a pair of side walls 76, an inner seal lip 78, and an outer seal lip 79.

Except for the cross-hatched portion shown in FIG. 12, the weather strip 61 is formed by means of extrusion molding like the first embodiment. In other words, the entire side section 62, a portion of the corner section 64 including the lips 78, 79 and a portion of each side wall 76, and the entire upper section 63 are formed integrally to define a single member. This member is manufactured in the following manner. A weather strip shaped identically with the weather strip 15 of the first embodiment is first formed by means of extrusion molding. A portion corresponding to the cross hatched portion of the corner section 64 shown in FIG. 12 is then removed. The cross-hatched portion of the corner section 64 shown in FIG. 12, which includes the base 75 and a portion of each side wall 76, is then molded independently by injection molding in a metal mold.

The functions and advantages of the weather strip 61 of the fourth embodiment will hereafter be described.

(a) The fourth embodiment has basically the same advantages as the first to third embodiments. Specifically, although the weather strip 61 is not completely formed by a single extruder, the entire side section 62, a portion of the corner section 64 including each seal lip 78, 79 and a portion of each side wall 76, and the entire upper section 63 are formed integrally to define a single member. The remaining portion of the corner section 64 is molded in a metal mold after the extrusion. Therefore, the weather strip 61 is constructed by two members. This facilitates the process and the equipment for manufacturing the weather strip 61, in comparison with the conventional weather strip, which includes four or more parts.

(b) Furthermore, the cross-hatched portion of the corner section 64, which includes the base 75 and a portion of each side wall 76, is molded independently in a metal mold. The independently molded portion, or reinforcement, restricts the restoring force of the weather strip 61, in comparison with the weather strip 15 of FIGS. 1 to 11. This prevents the cross sectional shape of the weather strip 61 from deforming. Therefore, the desired shape of the cross section is maintained.

Although several embodiments of the present invention have been described herein, it should be apparent to those skilled in the art that the present invention may be embodied in many other specific forms without departing from the spirit or scope of the invention. Particularly, it should be understood that the present invention may also be modified as described below.

Figure 14:
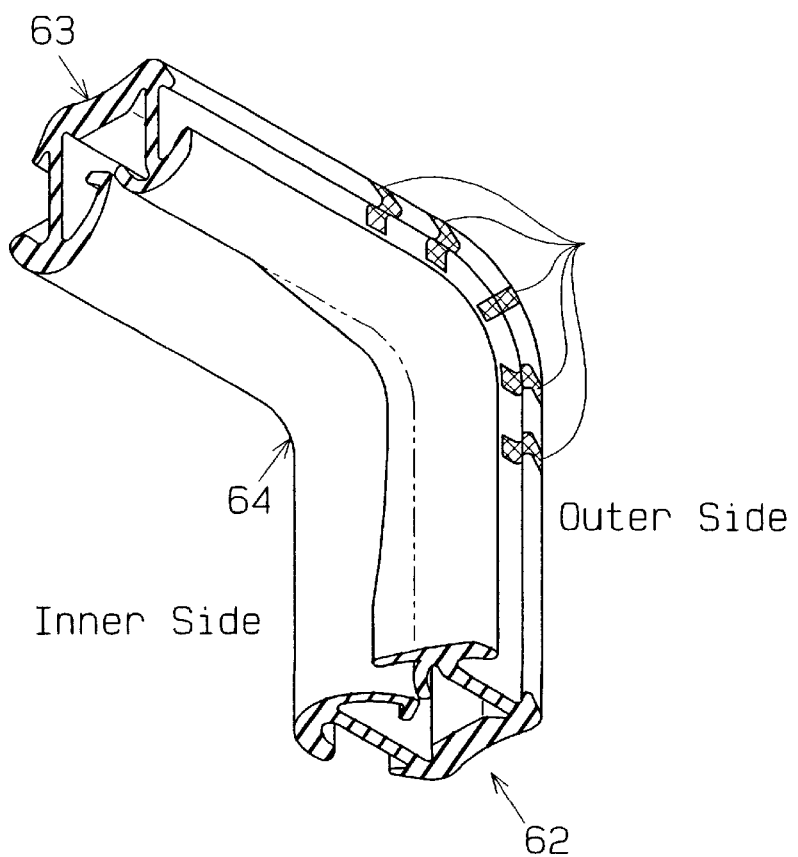
FIG. 14 is a perspective view showing a further embodiment of a corner section of a weather strip.
Figure 15A:
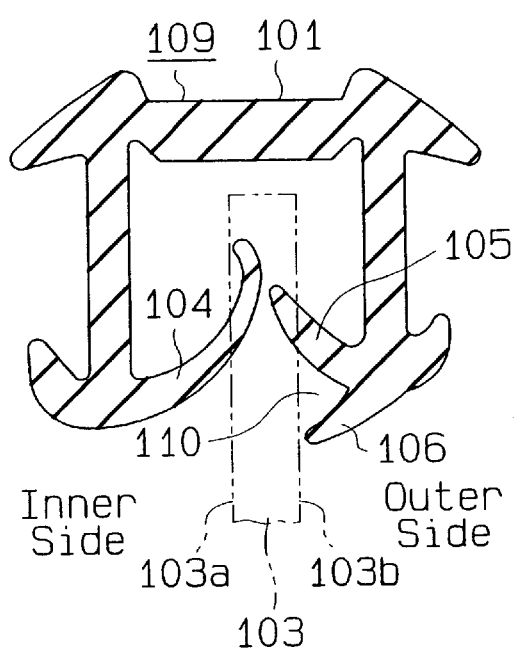
FIG. 15(a) is a cross-sectional view showing a side part of a weather strip of a conventional type.
Figure 15B:
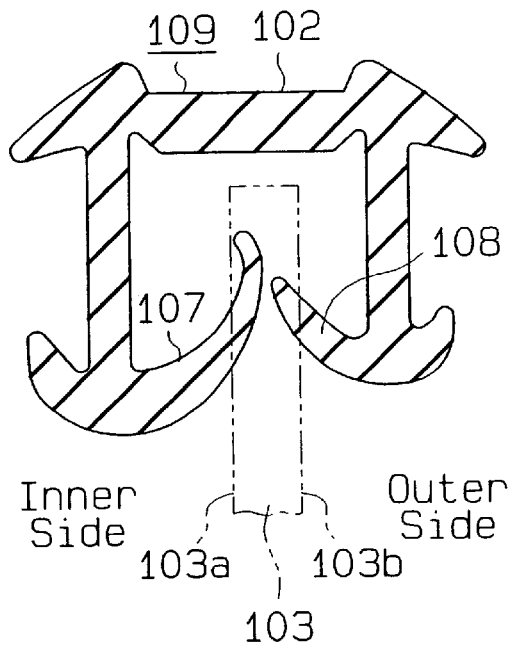
FIG. 15(b) is a cross-sectional view showing an upper part of the weather strip of the conventional type.

(1) In the fourth embodiment, the base 75 and a portion of each side wall 76 are formed integrally to extend longitudinally along the corner section 64. Part of the corner section 64 is removed and replaced with a molded reinforcement 75, 76. However, as shown in FIG. 14, a plurality of separate notches may be defined in a portion corresponding to the corner section 64. Reinforcements corresponding to the notches of the corner section 64 (the cross hatched portion shown in FIG. 14) are molded independently in a metal mold. This structure also has the same advantages (maintaining the cross sectional shape of the weather strip) as the fourth embodiment.

(2) Each weather strip 15, 61 may be formed of materials other than rubbers such as EPDM. The weather strip 15, 61 may be formed of an elastic rubber-like material, such as thermoplastic elastomer (TPE), soft vinyl chloride, and poly blend.

(3) Each auxiliary lip 25, 35 may be eliminated.

(4) In the upper sections 18, 63, the edge of each inner seal lip 29, 73 may be joined to the edge of the associated outer seal lip 30, 74. Thus, the entire upper sections 18, 63 are each defined as hollow seal portions.

Therefore, the present examples and embodiments are to be considered as illustrative and not restrictive and the invention is not to be limited to the details given herein, but may be modified within the scope of the appended claims.

What is claimed is:

1. A weather strip for attachment to a window frame of a vehicle for contacting both an inner surface and an outer surface of the window, wherein the weather strip supports the window while allowing the window to slide upward and downward with respect to the window frame, the weather strip comprising:

an elongated side section for attachment to a generally vertical member of the window frame;

an elongated upper section for attachment to a generally horizontal member of the window frame;

a corner section for attachment to a corner of the window frame;

a continuous inner seal lip extrusion for resiliently contacting the inner surface of the window, wherein the inner seal lip forms part of and is coextensive with the side section, the corner section, and the upper section, and wherein the cross sectional shape of the inner seal lip varies from the upper section to the side section;

a continuous outer seal lip extrusion for resiliently contacting the outer surface of the window, wherein the outer seal lip forms part of and is coextensive with the side section, the corner section, and the upper section, and wherein the cross sectional shape of the outer seal lip varies from the upper section to the side section, and wherein the outer seal lip is positioned opposite the inner seal lip; and the weather strip further comprising:

an outer auxiliary lip arranged on a proximal portion of the outer seal lip for increasing a pressing force applied by the outer seal lip to the window and for preventing wind from entering into a clearance defined between the outer seal lip and the window, wherein the auxiliary lip is an extrusion formed on the side section;

wherein the auxiliary lip terminates at a point in the vicinity of the corner section.

2. The weather strip as set forth in claim 1, wherein the inner seal lip is larger along the upper section than along the side section such that the inner seal lip is more rigid along the upper section than along the side section.

3. The weather strip as set forth in claim 1, wherein the inner seal lip includes an extruded groove for increasing flexibility, wherein the groove is formed along the side sections.

4. The weather strip as set forth in claim 1, wherein the side sections, the upper section, and the corner sections are entirely formed by a single extrusion.

5. The weather strip as set forth in claim 1, wherein at least one molded reinforcement is molded to a portion of each of the corner sections to strengthen the corner sections.

6. The weather strip as set forth in claim 5, wherein the molded reinforcement extends substantially along the entire corner of each of the sections.

7. The weather strip as set forth in claim 5, wherein a plurality of molded reinforcements are molded to the corner sections at separate positions.

8. A weather strip for attachment to a window frame of a vehicle for contacting both an inner surface and an outer surface of the window, wherein the weather strip supports the window while allowing the window to slide upward and downward with respect to the window frame, the weather strip comprising:

an elongated side section for attachment to a generally vertical member of the window frame;

an elongated upper section for attachment to a generally horizontal member of the window frame;

a corner section for attachment to a corner of the window frame;

a continuous inner seal lip extrusion for resiliently contacting the inner surface of the window, wherein the inner seal lip forms part of and is coextensive with the side section, the corner section, and the upper section, and wherein the cross sectional shape of the inner seal lip varies from the upper section to the side section:

a continuous outer seal lip extrusion for resiliently contacting the outer surface of the window, wherein the outer seal lip forms part of and is coextensive with the side section, the corner section, and the upper section, and wherein the cross sectional shape of the outer seal lip varies from the upper section to the side section, and wherein the outer seal lip is positioned opposite the inner seal lip; and the weather strip further comprising:

an outer auxiliary lip arranged on a proximal portion of the outer seal lip for increasing a pressing force applied by the outer seal lip for increasing a pressing force applied by the outer seal lip to the window and for preventing wind from entering into a clearance defined between the outer seal lip and the window, wherein the auxiliary lip is an extrusion formed on the side section;

wherein the auxiliary lip terminates at a point in the vicinity of the corner section; and wherein the auxiliary lip is tapered near the point where it terminates.

* * * * *